United States Patent
Ong (10) Patent No.: US 8,448,231 B2
(45) Date of Patent: May 21, 2013

(54) WALLED GARDEN SYSTEM FOR PROVIDING ACCESS TO ONE OR MORE WEBSITES THAT INCORPORATE CONTENT FROM OTHER WEBSITES AND METHOD THEREOF

(75) Inventor: David Ong, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 283 days.

(21) Appl. No.: 12/898,254

(22) Filed: Oct. 5, 2010

(65) Prior Publication Data

US 2012/0084852 A1   Apr. 5, 2012

(51) Int. Cl.
*G06F 9/00* (2006.01)
*G06F 15/16* (2006.01)
*G06F 17/00* (2006.01)

(52) U.S. Cl.
USPC .................................. 726/11; 726/1; 726/12

(58) Field of Classification Search
USPC ........................................... 726/12; 709/717
See application file for complete search history.

(56) References Cited

U.S. PATENT DOCUMENTS

| | | | |
|---|---|---|---|
| 7,308,487 B1* | 12/2007 | Dansie et al. | 709/219 |
| 7,526,792 B2* | 4/2009 | Ross | 726/2 |
| 7,849,507 B1* | 12/2010 | Bloch et al. | 726/22 |
| 7,984,500 B1* | 7/2011 | Khanna et al. | 726/22 |
| 2002/0015403 A1* | 2/2002 | McConnell et al. | 370/352 |
| 2002/0166063 A1* | 11/2002 | Lachman et al. | 713/200 |
| 2006/0005254 A1* | 1/2006 | Ross | 726/27 |
| 2006/0053205 A1* | 3/2006 | Boutroux et al. | 709/206 |
| 2008/0141342 A1* | 6/2008 | Curnyn | 726/3 |
| 2008/0163337 A1* | 7/2008 | Tuliani et al. | 726/2 |
| 2009/0292925 A1* | 11/2009 | Meisel | 713/176 |
| 2009/0328187 A1* | 12/2009 | Meisel | 726/13 |
| 2010/0135301 A1* | 6/2010 | Bosch et al. | 370/392 |
| 2011/0107407 A1* | 5/2011 | Ganesan | 726/6 |
| 2011/0184813 A1* | 7/2011 | Barnes et al. | 705/14.66 |
| 2011/0208850 A1* | 8/2011 | Sheleheda et al. | 709/223 |
| 2012/0054869 A1* | 3/2012 | Yen et al. | 726/24 |
| 2012/0084423 A1* | 4/2012 | McGleenon | 709/223 |

OTHER PUBLICATIONS

GlobalSuite OneView Internet 5.0.19 Online Help, About Fee Websites, Apr. 2, 2009.

* cited by examiner

*Primary Examiner* — Eleni Shiferaw
*Assistant Examiner* — Jing Sims
(74) *Attorney, Agent, or Firm* — Andrew T. MacMillan (57) ABSTRACT

A cleared sites list includes one or more hostname descriptors. A firewall includes rules associated with a cleared IP list including cleared IP addresses, and permits transfer of a cleared HTTP request from a user device to a cleared destination IP address that matches one of the cleared IP addresses. A controller examines a non-cleared HTTP request from the user device to a non-cleared destination IP address that does not match one of the cleared IP addresses, and acts as a transparent proxy between the user device and the non-cleared destination IP address when a destination host header of the non-cleared HTTP request matches a hostname descriptor of the cleared sites list. The controller further acts as a transparent proxy between the user device and the non-cleared destination IP address when a referrer header of the non-cleared HTTP request matches a hostname descriptor of the cleared sites list.

16 Claims, 7 Drawing Sheets

Cleared sites list

| Hostname descriptors | Cleared when referrer |
|---|---|
| *.cnn.com | NO |
| *.gmail.com | NO |
| *.mail.yahoo.com | NO |
| reservations.*.marriott.com | YES |
| www.marriott.com | YES |
| *.travel-tours.com | NO |

WALLED GARDEN SYSTEM FOR PROVIDING ACCESS TO ONE OR MORE WEBSITES THAT INCORPORATE CONTENT FROM OTHER WEBSITES AND METHOD THEREOF

BACKGROUND OF THE INVENTION

1. Field of the Invention

The invention pertains generally to limiting website access on a computer network. More specifically, the invention relates to an electronic walled garden for providing access to one or more websites that incorporate content from other websites.

2. Description of the Prior Art

For a variety of reasons, network providers may require users to log in before allowing them to access websites on the Internet. Logging in may involve one or more of payment, authentication, and/or registration. However, it may also be desirable to provide free access to certain websites for guest users who have not logged in. For example, a hotel may desire a limited number of external websites such as a hotel reservation website and a tour operator website to be freely accessible from laptops and other web browsing devices within the hotel even for guests who have not logged in.

A walled garden is a well-known concept allowing a network administrator to limit access to only some external websites. Walled gardens typically include an administrator-specified list of external websites which are to be freely available, and these sites are specified by either IP addresses or hostnames. Before a user has logged in, the walled garden ensures that only external websites listed on the administrator-specified cleared sites list may be accessed by the user.

The inventor of the present application recognized a problem with typical walled gardens in that a single Internet website may be provided from a plurality of different sub domains and IP addresses, and not all of the different sub domains and IP addresses may be known to the administrator at the time the walled garden is configured. Additionally, sub domains and IP addresses utilized by external websites may change after the walled garden is configured and the administrator may be unaware of these external changes. Therefore it is very difficult for an administrator to permanently configure a typical walled garden with a list of allowed websites because the administrator does not know all details of the external sites and does not know when known details will change. The result of missing or incorrect sub domains and IP addresses configured at the walled garden is that some content that is supposed to be freely available to users will not be available. Websites that are affected may appear to be unavailable or malfunctioning to users who are not logged in.

Figure 1:
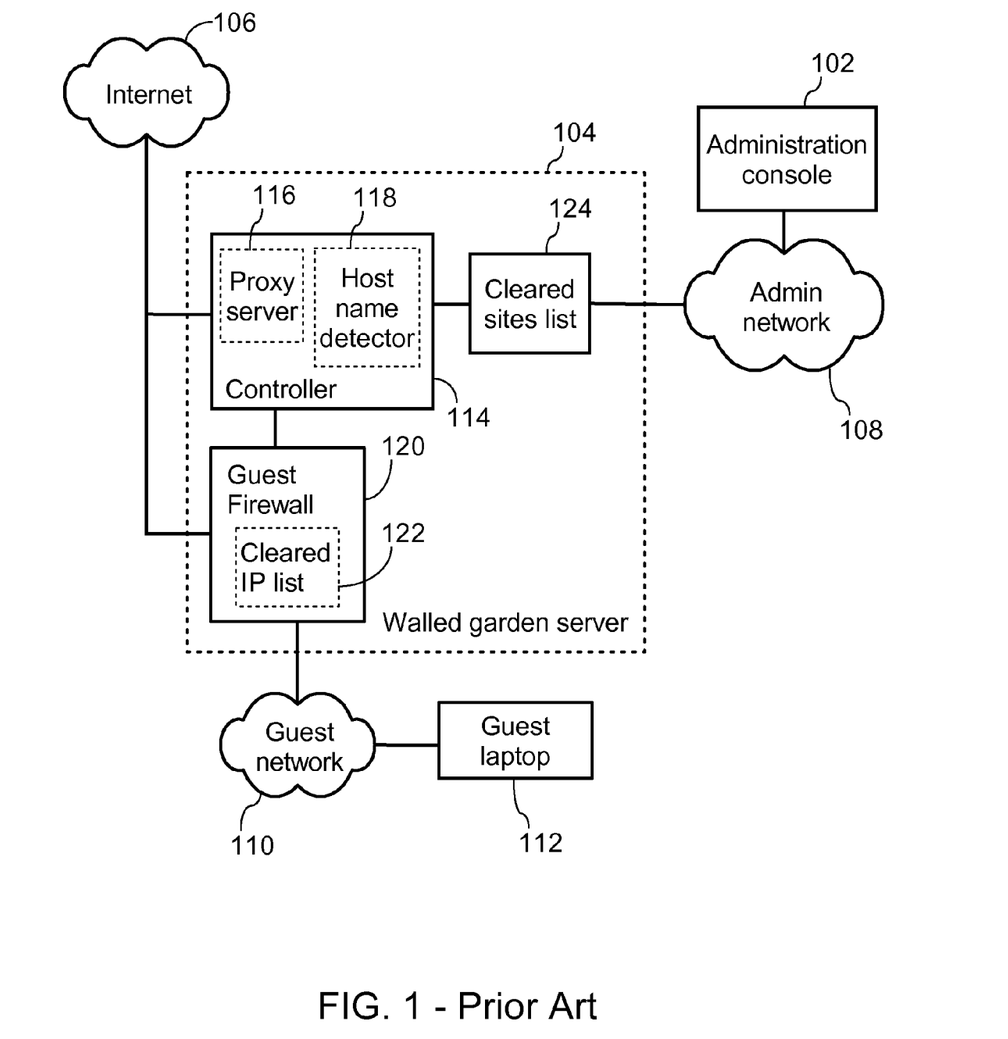
FIG. 1 is an illustration of the present inventor's own prior art smart walled garden system.

FIG. 1 is an illustration of the present inventor's own prior art smart walled garden system 100. To solve the above-described problem, the inventor of the present invention conceived of and reduced to practice the smart walled garden system 100 that allows the usage of wildcards by an administrator when defining the cleared sites list 124. The present inventor's implementation of the smart walled garden system 100, further described below, was rolled out to a plurality of hotels in the United States no later than March 2009 and remains in use today.

Figure 2:
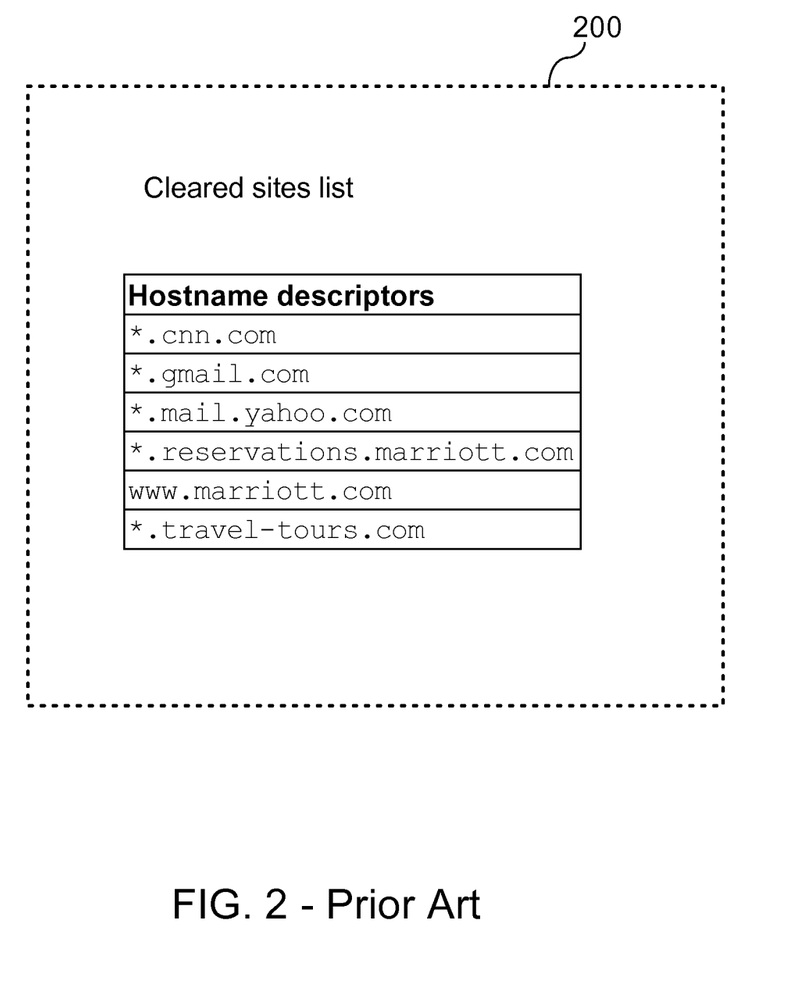
FIG. 2 illustrates an example cleared sites list of FIG. 1.

Referring to FIG. 1, an administrator console 102 to the smart walled garden system 100 is provided for an administrator of the guest network 110 to enter on the cleared sites list 124 hostname descriptors corresponding to websites that are to be freely available. The admin console 102 is isolated on an admin network 108 for security purposes. FIG. 2 illustrates an example cleared sites list 200. As shown, the hostname descriptors on the cleared sites list 200 may include wild cards at the beginning of a portion of the hostname to indicate other allowed sub domains for that host. Any websites matching the hostname descriptors of the cleared sites list 200 are freely accessible by a guest laptop 112 without requiring a user of the guest laptop 112 to log in or make payment.

At start-up, the controller 114 parses the cleared sites list 124 and does a DNS lookup of all exact site names that do not include wild cards to determine their corresponding one or more IP addresses. The resulting IP addresses are added to the cleared IP list 122 of the firewall 120. Using the cleared sites list 200 shown in FIG. 2 as an example, the DNS-resolved IP address of "www.marriott.com" would be automatically added to the cleared IP list 122. The cleared IP list 122 is used by the firewall 120 to determine which destination IP addresses can be directly accessed by users who are not logged in.

Figure 3:
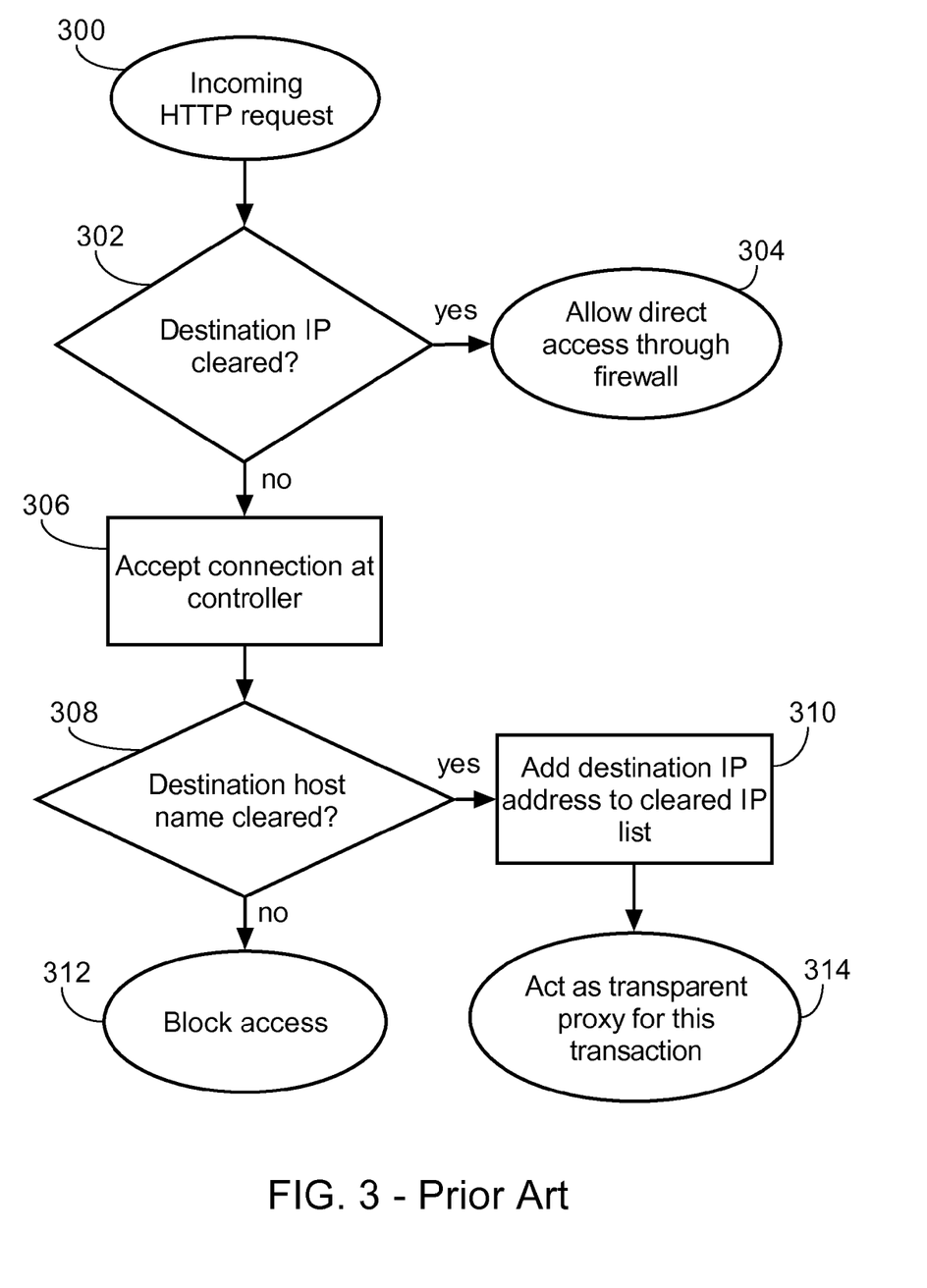
FIG. 3 shows a flowchart describing operations of the smart walled garden system of FIG. 1 when a new hypertext transfer protocol (HTTP) request to access an external website is received from a guest laptop.

FIG. 3 shows a flowchart describing operations of the smart walled garden system 100 when a new hypertext transfer protocol (HTTP) request to access an external website is received from guest laptop 112. The following steps are performed:

Step 300: An incoming HTTP connection request is received at the firewall 120.

Step 302: According to the firewall rules associated with the cleared IP list 122, the firewall 120 either permits direct transfer of the connection request to the Internet 106, or forwards the connection request to the controller 114. More specifically, when the destination IP address of the connection request matches one of the IP addresses on the cleared IP list 122, control proceeds to step 304; otherwise, control proceeds to step 306.

Step 304: Because the destination IP address is cleared, the firewall 120 allows direct access to the Internet 106 for the connection request.

Step 306: Because the destination IP address is not cleared, the firewall 120 forwards the connection request to the controller 114 and the controller accepts the connection request at this step.

Step 308: After the controller 114 accepts the connection request, the host name detector 118 examines the contents of the HTTP request to determine the destination host name header. The destination host name header is a standard HTTP field, also known as the host request-header field, that specifies the Internet host and port number of the resource being requested. In other words, the destination host name header includes the host name of the destination website. The destination host name header is required for all HTTP/1.1 request messages. If the destination host name matches one of the site names on the cleared sites list 124, control proceeds to step 310; otherwise, control proceeds to step 312. Wildcards on the cleared site list 124 are taken into account when searching for a match between the destination host name and the hostname descriptors listed on the cleared sites list 124.

Step 310: Because the destination host header indicates a cleared site, the controller 114 adds the destination IP address to the cleared IP list 122 for the firewall rules.

Step 312: Because the destination host header indicates a website that is not on the cleared sites list 124, the controller 114 blocks access.

Step 314: Utilizing the transparent proxy 114, the controller 114 acts as a transparent proxy for this HTTP request-response transaction between the guest laptop 112 and the destination host.

To ensure the smart walled garden system 100 takes into account changes to IP addresses of external websites, once per day, all IP addresses are purged from the cleared IP list 122. Similar to at start-up, the controller 114 then parses the cleared sites list 124 and does a DNS lookup of all exact site names that do not include wild cards to determine their corresponding one or more IP addresses. The resulting IP addresses are added to the cleared IP list 122 of the firewall 120. Thereafter, as users access sites that match the allowed sites on the cleared sites list 124 having wildcards, more IP addresses are automatically added to the cleared IP list 122 as described above. Because the cleared IP list 122 is deleted and rebuilt once per day, the list does not grow infinitely as addresses change. Also, older (possibly invalid) IP addresses are automatically removed and rechecked.

One advantage of the inventor's prior art smart walled garden system 100 is that administrators can allow all sub domains of an external website regardless of how many IP addresses are associated with these locations and without knowing in advance all the exact sub domains. Changes to the websites involving new or modified sub domains may also be handled automatically by the use of wildcards in the cleared sites list 124. Another advantage is that standard firewalls supporting dynamic rules can be used, which reduces complexity and cost because a single firewall can handle all its regular duties plus the walled garden system 100 duties. Standard DNS systems are also supported. If the IP address of a cleared website changes, the controller 120 will automatically add the new IP address to the cleared IP list and the user will not be affected. Additionally, proxying is only performed by the controller 120 for the first HTTP request-response transaction for sites that match one of the websites on the cleared sites list 124. Then, for subsequent transactions, the destination IP address of the allowed site will be on the cleared IP list 122 and HTTP traffic will therefore be transferred directly by firewall 120. This is beneficial because performing proxy operations adds some load to the walled garden server 104 so the present inventor's prior art smart walled garden system 100 minimizes the load by only requiring transparent proxying to be performed by the controller 114 once per IP address that is newly added to the cleared IP list 122.

SUMMARY OF THE INVENTION

According to one aspect of the invention, there is disclosed a walled garden system for providing access to one or more websites specified on a cleared sites list. The cleared sites list includes one or more hostname descriptors. The walled garden system comprises a firewall having rules associated with a cleared internet protocol (IP) list including one or more cleared IP addresses. The firewall permits transfer of a cleared hypertext transfer protocol (HTTP) request from a user device to a cleared destination IP address that matches one of the cleared IP addresses. A controller examines a non-cleared HTTP request from the user device to a non-cleared destination IP address that does not match one of the cleared IP addresses, and acts as a transparent proxy between the user device and the non-cleared destination IP address when a destination host header of the non-cleared HTTP request matches a hostname descriptor of the cleared sites list. The controller further acts as the transparent proxy between the user device and the non-cleared destination IP address when a referrer header of the non-cleared HTTP request matches a hostname descriptor of the cleared sites list.

According to another aspect of the invention, there is disclosed a method of providing access to one or more websites specified on a cleared sites list. The cleared sites list includes one or more hostname descriptors. The method comprises providing a firewall having rules associated with a cleared internet protocol (IP) list including one or more cleared IP addresses; providing a controller having access to the cleared sites list; and permitting transfer of a cleared hypertext transfer protocol (HTTP) request by the firewall, the cleared HTTP request being from a user device to a cleared destination IP address that matches one of the cleared IP addresses. The method further comprises examining a non-cleared HTTP request by the controller. The non-cleared HTTP request is from the user device to a non-cleared destination IP address that does not match one of the cleared IP addresses. The method also includes transparent proxying between the user device and the non-cleared destination IP address when a destination host header of the non-cleared HTTP request matches a hostname descriptor of the cleared sites list; and transparent proxying between the user device and the non-cleared destination IP address when a referrer header of the non-cleared HTTP request matches a hostname descriptor of the cleared sites list.

According to another aspect of the invention, there is disclosed a system for providing access to one or more websites specified on a cleared sites list. The cleared sites list includes one or more hostname descriptors. The system comprises means for permitting transfer of a cleared hypertext transfer protocol (HTTP) request, the cleared HTTP request being from a user device to a cleared destination IP address that matches a cleared IP addresses; and means for examining a non-cleared HTTP request, the non-cleared HTTP request being from the user device to a non-cleared destination IP address that does not match a cleared IP addresses. The system further comprises means for transparent proxying between the user device and the non-cleared destination IP address when a destination host header of the non-cleared HTTP request matches a hostname descriptor of the cleared sites list; and means for transparent proxying between the user device and the non-cleared destination IP address when a referrer header of the non-cleared HTTP request matches a hostname descriptor of the cleared sites list.

These and other embodiments and advantages of the embodiments of the present invention will become apparent from the following detailed description, taken in conjunction with the accompanying drawings, illustrating by way of example the principles of the invention.

DETAILED DESCRIPTION

The present inventor has recognized a new problem with existing walled garden technology. Briefly, the new problem is website integration. Both content and browser-executed applications and scripts used on a particular website may in fact be incorporated from third party websites such as in the form of external Javascript, Java applets, AJAX programs, external images, iframes, etc. Although these technologies are themselves all well-known, as is the possibility of loading content from a third-party site such as when utilizing third-party Javascript to display advertisements (e.g., Google AdSense), as website operators realize the advantages of integrating and merging content from multiple independent websites and servers, usage of these techniques is increasing in many exciting and beneficial-to-end-user ways. However, concerning current walled garden technology such as the smart walled garden system 100 of FIG. 1, unless a third-party content provider is explicitly added to the cleared sites list 124, current walled garden technology prevents a cleared website from incorporating third-party content. Because cleared websites may incorporate new or changed third-party content at any time, administrators of current walled gardens must continuously try to keep their walled gardens properly configured by manually authorizing (and unauthorizing) third-party websites and servers as required.

Figure 4:
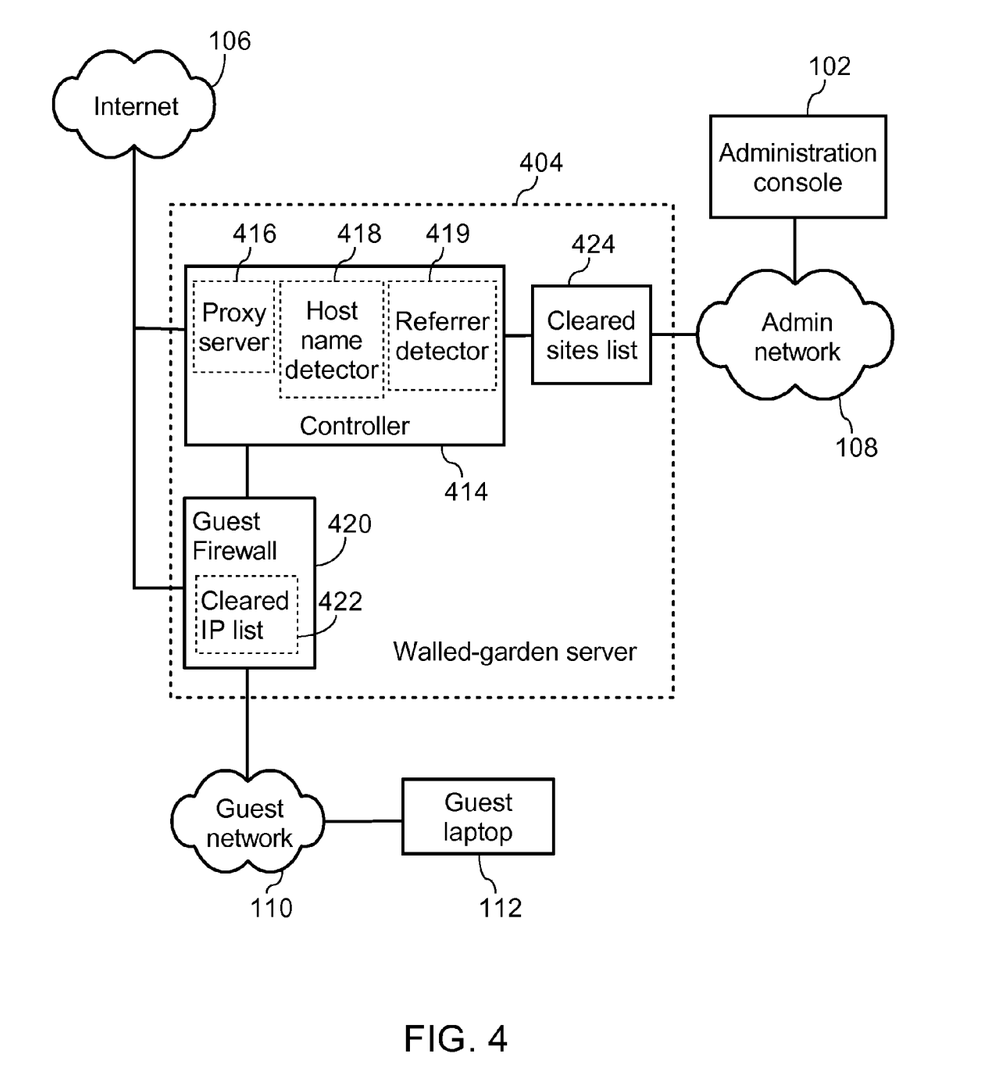
FIG. 4 illustrates an improved smart walled garden system according to a first exemplary configuration of the present invention.

FIG. 4 illustrates an improved smart walled garden system 400 according to a first exemplary configuration. Descriptions of components generally behaving as previously described for FIG. 1 and having the same reference numerals as shown in FIG. 1 are not repeated. As shown in FIG. 4, the improved smart walled garden system 400 includes a walled-garden server 404 having a plurality of modules including a controller 414, a cleared sites list 424, and a guest firewall 420. The controller 414 includes a transparent proxy server 416, a host name detector 418, and a referrer detector 419; and the firewall 420 includes a cleared IP list 422.

Figure 5:
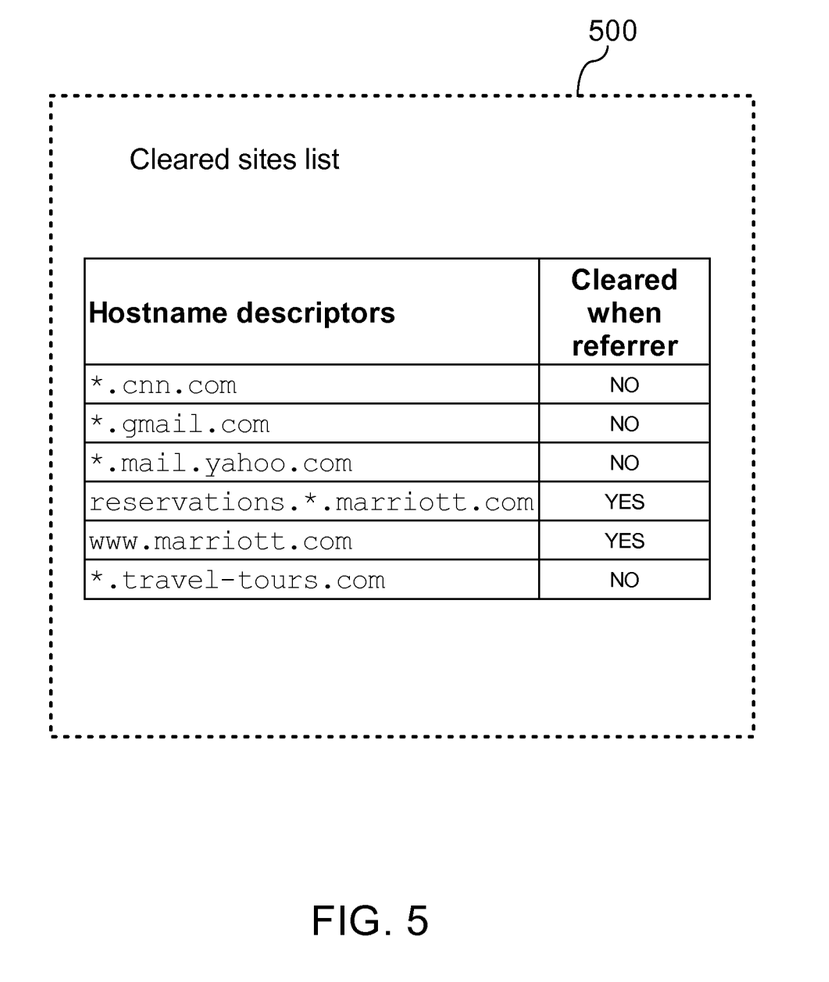
FIG. 5 illustrates an exemplary cleared sites list of FIG. 4 having configuration options to enable and disable referrer based access for each hostname descriptor.

FIG. 5 illustrates an exemplary cleared sites list 500 having configuration options to enable and disable referrer based access for each hostname descriptor. When the "Cleared as a referrer" configuration option for a particular hostname descriptor is set to "YES", this indicates that any website matching that hostname descriptor is authorized to incorporate content from third-party website(s), even if the third-party website(s) are not included on the cleared sites list 500. This is beneficial to support walled garden access to a website integrating content from any third-party websites or servers without requiring the walled garden administrator to reverse engineer the cleared website to see which third-party websites need to be authorized or to keep track of changes to the cleared website or the third-party websites. As shown, wildcards may be utilized in the cleared sites list 200 to enable referrer-based access for any sub domains of a website, including wildcards that match one or more characters in the middle of the hostname. When the "Cleared as a referrer" configuration option for a particular hostname descriptor is set to "NO", this indicates that websites matching that hostname descriptor are not authorized to incorporate content from third-party websites. This may be beneficial to filter out or block access to third party content from any website matching the particular hostname descriptor.

Figure 6:
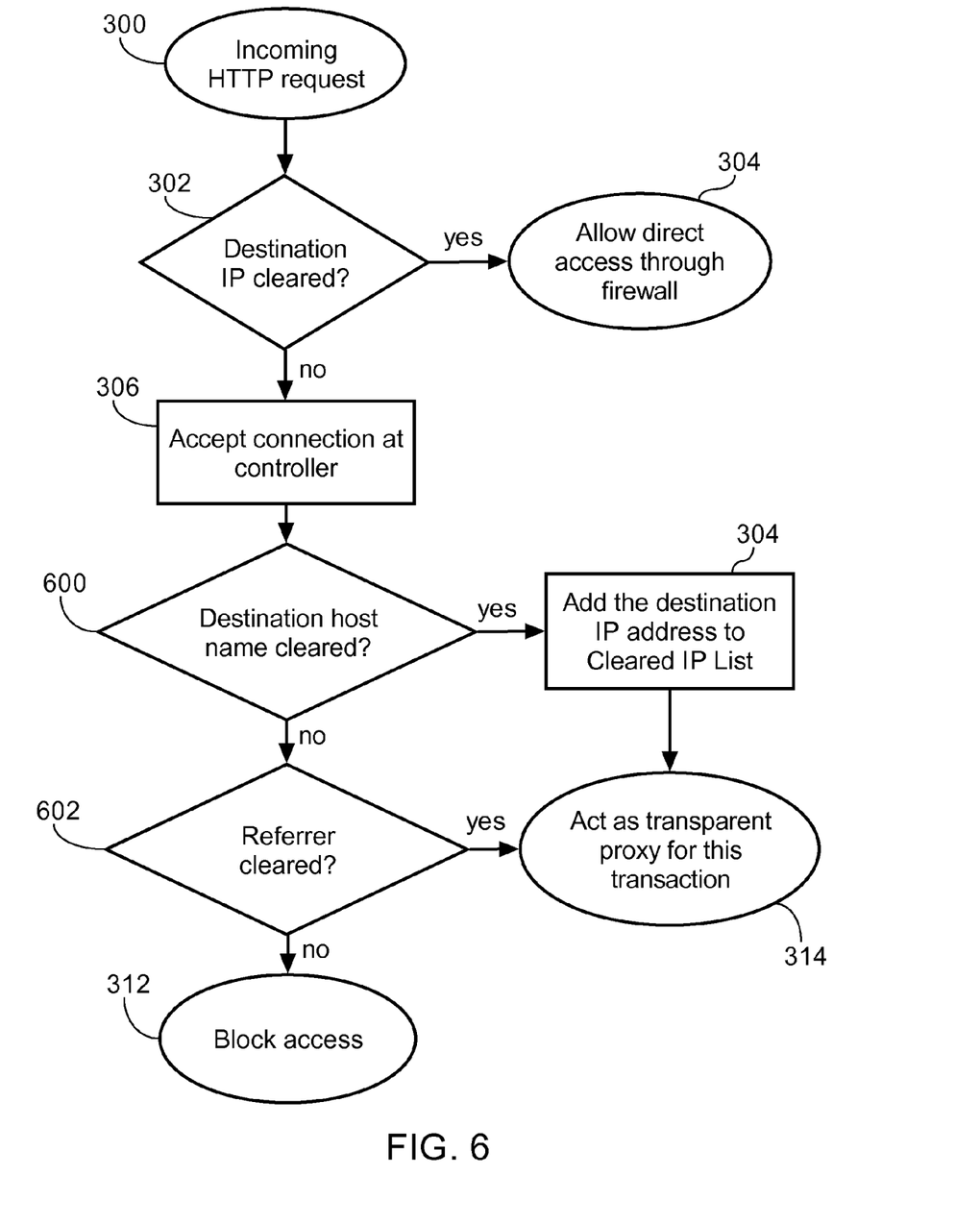
FIG. 6 shows a flowchart describing operations of an improved smart walled garden system when an HTTP request to access an external website is received from a guest laptop according to one configuration of the present invention.

FIG. 6 shows a flowchart describing operations of an improved smart walled garden system 400 when an HTTP request to access an external website is received from a guest laptop 112 according to one configuration. Steps having substantially similar function and operation as already described for FIG. 3 are numbered with the same reference numerals in FIG. 6. These steps are performed by corresponding components of the walled-garden server 404 in the improved smart walled garden system 400 and a repeated description is omitted for brevity. As shown in FIG. 6, the flowchart includes two new steps as follows:

Step 600: The controller 414 accepts the connection request and the host name detector 418 examines the contents of the HTTP request to determine the destination host header. Similar to step 308 in FIG. 3, if the destination host matches one of the hostname descriptors on the cleared sites list 424, control proceeds to step 310. Wildcards on the site list 424 are taken into account when searching for a match between the destination host and the hostname descriptors listed on the cleared sites list 424. However, instead of immediately blocking access as is done in the prior art system 100 of FIG. 3, if the destination host header does not match one of the hostname descriptors on the cleared sites list 424, in this configuration control proceeds to step 602.

Step 602: The referrer detector 419 examines the contents of the HTTP request to determine the referrer header. The referrer header, often deliberately spelt "referer", is a standard HTTP field that may be added by an Internet browser (i.e., running on the user's laptop 112) to identify the webpage that is linking to the destination. Therefore, by checking the referrer header, the referrer detector 419 may determine from which website the request originated. If the hostname specified by the referrer header matches (taking into account any wildcards) one of the hostname descriptors of the cleared sites list 500, and if that matching hostname descriptor is "cleared as a referrer", control proceeds to step 314 so that the proxy server 416 will act as a transparent proxy and allow the cleared website (i.e., the referrer) to load content from another website. The content may therefore be loaded even if the destination website is not itself a cleared website. On the other hand, if the referrer header is empty, not present, or does not match a referrer-enabled hostname descriptor on the cleared sites list 424, control proceeds to original step 312 to block the access request.

In this configuration, websites that do not have a matching hostname descriptor on the cleared sites list 424 are accessible through the walled garden system 400 as long as the access request is to integrate content with a webpage on a website that does match a hostname descriptor on the cleared sites list 424, and as long as the matching hostname descriptor has the "Cleared as a referrer" configuration option set (shown in FIG. 5). However, if a user tries to go directly to a website not on the cleared sites list 424, the controller 414 will prevent the connection because the referrer field will not match a cleared hostname descriptor (i.e., because the referrer header will be empty or not included in the HTTP request).

Figure 7:
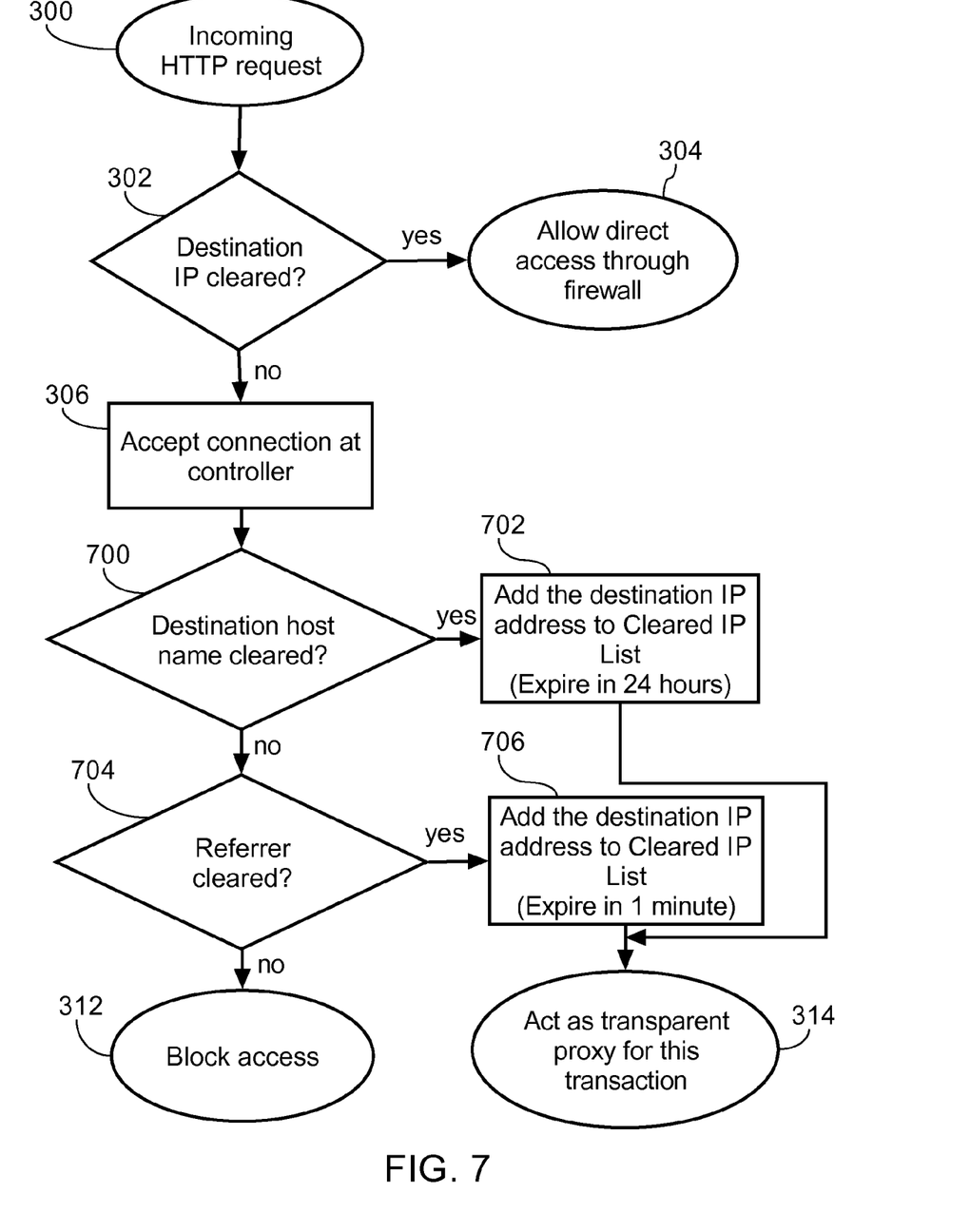
FIG. 7 shows a flowchart describing operations of an improved smart walled garden system when an HTTP request to access an external website is received from a guest laptop according to another configuration of the present invention.

FIG. 7 shows a flowchart describing operations of an improved smart walled garden system 400 when an HTTP request to access an external website is received from a guest laptop 112 according to another configuration. Again, steps having substantially similar function and operation as already described for FIG. 3 are numbered with the same reference numerals in FIG. 7. These steps are performed by corresponding components of the server 400 in the improved smart walled garden system 400 and a repeated description is omitted for brevity. As shown in FIG. 7, the flowchart includes four new steps as follows:

Step 700: The controller 414 accepts the connection request and the host name detector 418 examines the contents of the HTTP request to determine the destination host header.

If, taking into account any wildcards, the destination host matches one of the hostname descriptors on the cleared sites list 424, control proceeds to step 702. Otherwise, if the destination host does not match one of the hostname descriptors on the cleared sites list 424, control proceeds to step 704.

Step 702: Because the destination host header indicates a cleared site, the controller 414 adds the destination IP address to the cleared IP list 422 for the firewall rules. Additionally, the newly added IP address is set to expire after a first duration such as 24-hours, for example. The expiration may be done by including an expiry time stamp associated with the IP address on the cleared IP list 422, or could be done via any number of other methods such as keeping the cleared IP list 422 in a database and clearing out IP addresses added at step 702 after a predetermined period such as 24-hours. Automatically clearing the IP addresses added at step 702 once per predetermined interval such as once per day is also possible. Afterwards, control proceeds to original step 314 to transparently proxy this HTTP request-response transaction.

Step 704: The referrer detector 419 examines the contents of the HTTP request to determine the referrer header to determine from which website the request originated. If the referring hostname specified by the referrer header matches (taking into account any wildcards) one of the hostname descriptors of the cleared sites list 500, and if that matching hostname descriptor is "Cleared as a referrer" on the cleared sites list 500, control proceeds to step 706. Otherwise, if the referrer header is empty or does not match a referrer-enabled hostname descriptor on the cleared sites list 500, control proceeds to original step 312 to block the access request.

Step 706: Because the referrer is a cleared site, to reduce server load caused by acting as a transparent proxy, the controller 414 adds the destination IP address to the cleared IP list 422 for the firewall rules. Additionally, this newly added IP address is set to expire after a second duration such as 1-minute, for example. To prevent giving users unlimited access to a non-cleared website, the expiry duration for IP addresses added at step 706 may only be long enough for a typical website to load all the content it needs from a third-party website. The expiration may be done by including an expiry time stamp associated with the IP address on the cleared IP list 422, or could be done via any number of other methods such as keeping the cleared IP list 422 in a database and clearing out IP addresses added at step 706 after a predetermined period such as 1-minute. Automatically clearing the IP addresses added at step 706 once per minute is another option. Setting a timer (not shown) within the controller 414 when the IP address is added and then clearing the IP addresses added at step 706 after the timer expires is another option. Afterwards, control proceeds to original step 314 to transparently proxy this HTTP request-response transaction.

A benefit of the configuration shown in FIG. 7 is that third-party websites are temporarily added to the cleared IP list 422 at the firewall 420. In this way, when a cleared website begins to load many different objects from a third-party website, such as when loading different applets, images, and other content, the traffic will flow directly through the firewall 420 and little or no load will be placed on the walled-garden server 404. After a short duration sufficient to load all the third-party content, the firewall 420 may be automatically configured to no longer allow this access by expiring the IP address added at step 706. In the event the duration is too short and content is still being loaded from the third-party website, the controller 414 will again automatically open up the firewall for the third-party website (at step 706). Although, this also means that, during the time the firewall is opened, guest laptop 112 could directly access the third-party (i.e., non-cleared) website, the access window is only momentary in nature and would not be known to a typical user.

In summary, a cleared sites list includes one or more hostname descriptors. A firewall includes rules associated with a cleared IP list including cleared IP addresses, and permits transfer of a cleared HTTP request from a user device to a cleared destination IP address that matches one of the cleared IP addresses. A controller examines a non-cleared HTTP request from the user device to a non-cleared destination IP address that does not match one of the cleared IP addresses, and acts as a transparent proxy between the user device and the non-cleared destination IP address when a destination host header of the non-cleared HTTP request matches a hostname descriptor of the cleared sites list. The controller further acts as a transparent proxy between the user device and the non-cleared destination IP address when a referrer header of the non-cleared HTTP request matches a hostname descriptor of the cleared sites list.

Although the invention has been described in connection with a preferred embodiment, it should be understood that various modifications, additions and alterations may be made to the invention by one skilled in the art without departing from the spirit and scope of the invention. For example, the "Cleared as a referrer" configuration options illustrated in FIG. 5 may default to "YES" or may not be utilized or checked at step 704 if it is desired that all websites matching hostname descriptors on the cleared sites list 424 be referrer-enabled. In another configuration, referrer-enabled webpage descriptors rather than hostname descriptors may be utilized. Webpage descriptors may be specified as full uniform resource locators (URLs) and may also include wildcards as necessary to match allowed webpages. As opposed to an entire website, this would allow only certain pages of content on a particular website to incorporate content from non-cleared sites. Additionally, although the description of the invention has involved an example walled garden at a hotel, the present invention is equally applicable to any hospitality related location or service wishing to limit website access to a subset of websites. Examples of hospitality locations include but are not limited to hotels, motels, resorts, hospitals, apartment/townhouse complexes, restaurants, retirement centres, cruise ships, busses, airlines, shopping centres, passenger trains, etc. Examples of Internet browsing devices include set-top boxes, mobile phones, laptop computers, notebook computers, desktop computers, tablet computers, personal digital assistants (PDAs), etc. Similarly, the present invention is also useful outside the hospitality industry such as when utilized by a parent to limit access to approved websites for a child, for example. In general, the techniques of the present intention may be included in any walled garden application.

The above description describes elements of an improved smart walled garden system 400 that may include one or more modules, some of which are explicitly shown in the figures, others that are not. As used herein, the term "module" may be understood to refer to computing software, firmware, hardware, and/or various combinations thereof. It is noted that the modules are exemplary. For example, a processor (not shown) may operate pursuant to instructions stored on a storage medium to provide the functions as described for the modules. The modules may also be combined, integrated, separated, and/or duplicated to support various applications. Also, a function described herein as being performed at a particular module may be performed at one or more other modules and/or by one or more other devices instead of and/or in addition to the function performed at the particular module. Further, the modules may be implemented across multiple devices and/or other components local or remote to one another. Additionally, the modules may be moved from one device and added to another device, and/or may be included in both devices. In addition to a dedicated physical computing device, the word "server" may also mean a service daemon on a single computer, virtual computer, or shared physical computer, for example. Additionally, all combinations and permutations of the above described features and configurations are within the scope of the invention.

What is claimed is:

1. A walled garden system for providing access from user devices to one or more websites specified on a cleared sites list, the cleared sites list having one or more hostname descriptors, the walled garden system comprising:
   a firewall device having rules associated with a cleared internet protocol (IP) list including one or more cleared IP addresses corresponding to websites on the cleared sites list, wherein the cleared sites list contains a list of external websites accessible by a user and specified by either IP addresses or hostnames;
   the firewall device for permitting direct transfer of only cleared hypertext transfer protocol (HTTP) requests from a user device, wherein each of the cleared HTTP requests is to a cleared destination IP address that matches one of the cleared IP addresses; and
   a controller for examining non-cleared HTTP requests from the user device, wherein each of the non-cleared HTTP requests is to a non-cleared destination IP address that does not match one of the cleared IP addresses,
   the controller for acting as a transparent proxy between the user device and a non-cleared destination IP address of a non-cleared HTTP request when any of a destination host header and a referrer header of the non-cleared HTTP request matches a hostname descriptor of the cleared sites list, and
   the controller for blocking the non-cleared HTTP request when neither of the destination host header nor the referrer header of the non-cleared HTTP request matches a hostname descriptor of the cleared sites list;
   wherein the controller is further configured to:
   add, with a first expiry setting, the destination IP address of the non-cleared HTTP request to the cleared IP addresses of the firewall device when the destination host header of the non-cleared HTTP request matches a hostname descriptor of the cleared sites list; and
   add, with a second expiry setting, the destination IP address of the non-cleared HTTP request to the cleared IP addresses of the firewall device when only the referrer header of the non-cleared HTTP request matches a hostname descriptor of the cleared sites list.

2. The walled garden system of claim 1, wherein:
   the cleared sites list further includes at least one referrer-enabled hostname descriptor having a configuration option enabling referrer based access; and
   when the destination host header of the non-cleared HTTP request does not match a hostname descriptor of the cleared sites list, the controller is for acting as the transparent proxy between the user device and the non-cleared destination IP address of the non-cleared HTTP request only when the referrer header of the non-cleared HTTP request matches a referrer-enabled hostname descriptor of the cleared sites list.

3. The walled garden system of claim 1, wherein:
   at least one hostname descriptor on the cleared sites list includes one or more wildcards; and
   the controller is further for searching for matches of the referrer header of the non-cleared HTTP request to a hostname descriptor of the cleared sites list taking into account the wildcards.

4. The walled garden system of claim 1, wherein:
   the controller is further for removing destination IP addresses from the cleared IP addresses after an expiry duration associated with each destination IP address; and
   the first expiry setting specifies a first expiry duration being longer than a second expiry duration specified by the second expiry setting.

5. The walled garden system of claim 1, wherein:
   the firewall directly transfers connection requests associated with the cleared HTTP requests to an external network, and forwards connection requests associated with the non-cleared HTTP requests to the controller; and
   the controller accepts the connection requests associated with the non-cleared HTTP requests in order to examine the non-cleared HTTP requests.

6. The walled garden system of claim 1, wherein when acting as the transparent proxy between the user device and the non-cleared destination IP address when the referrer header of the non-cleared HTTP request matches a hostname descriptor of the cleared sites list, the controller is for acting as the transparent proxy for only one HTTP request-response transaction between the user device and the non-cleared destination IP address.

7. The walled garden system of claim 1, wherein the controller is further for periodically performing a DNS lookup on exact hostname descriptors on the cleared sites list and adding one or more resulting DNS-resolved IP addresses to the cleared IP list.

8. The walled garden system of claim 7, wherein the exact hostname descriptors on the cleared sites list are hostname descriptors that do not include wildcards.

9. A method in a walled garden system of providing access from user devices to one or more websites specified on a cleared sites list, the cleared sites list having one or more hostname descriptors, the method comprising: storing a cleared internet protocol (IP) list including one or more cleared IP addresses corresponding to websites on the cleared sites list, wherein the cleared sites list contains a list of external websites accessible by a user and specified by either IP addresses or hostnames;
   permitting direct transfer of only cleared hypertext transfer protocol (HTTP) requests from a user device, wherein each of the cleared HTTP requests is to a cleared destination IP address that matches one of the cleared IP addresses;
   examining non-cleared HTTP requests from the user device, wherein each of the non-cleared HTTP requests is to a non-cleared destination IP address that does not match one of the cleared IP addresses;
   transparent proxying between the user device and a non-cleared destination IP address of a non-cleared HTTP request when any of a destination host header and a referrer header of the non-cleared HTTP request matches a hostname descriptor of the cleared sites list;
   blocking the non-cleared HTTP request when neither of the destination host header nor the referrer header of the non-cleared HTTP request matches a hostname descriptor of the cleared sites list;
   adding, with a first expiry setting, the destination IP address of the non-cleared HTTP request to the cleared IP addresses when the destination host header of the non-cleared HTTP request matches a hostname descriptor of the cleared sites list; and adding, with a second expiry setting, the destination IP address of the non-cleared HTTP request to the cleared IP addresses when only the referrer header of the non-cleared HTTP request matches a hostname descriptor of the cleared sites list.

10. The method of claim 9, further comprising:

when the destination host header of the non-cleared HTTP request does not match a hostname descriptor of the cleared sites list, transparent proxying between the user device and the non-cleared destination IP address of the non-cleared HTTP request only when the referrer header of the non-cleared HTTP request matches a referrer-enabled hostname descriptor of the cleared sites list;

wherein the cleared sites list further includes at least one referrer-enabled hostname descriptor having a configuration option enabling referrer based access.

11. The method of claim 9, further comprising:

searching for matches of the referrer header of the non-cleared HTTP request to a hostname descriptor of the cleared sites list taking into account wildcards;

wherein at least one hostname descriptor on the cleared sites list includes one or more wildcards.

12. The method of claim 9, further comprising:

removing destination IP addresses from the cleared IP addresses after an expiry duration associated with each destination IP address;

wherein the first expiry setting specifies a first expiry duration being longer than a second expiry duration specified by the second expiry setting.

13. The method of claim 9, further comprising:

directly transferring connection requests associated with the cleared HTTP requests to an external network; and accepting connection requests associated with the non-cleared HTTP requests in order to examine the non-cleared HTTP requests.

14. The method of claim 9, further comprising, when transparent proxying between the user device and the non-cleared destination IP address when the referrer header of the non-cleared HTTP request matches a hostname descriptor of the cleared sites list, transparent proxying for only one HTTP request-response transaction between the user device and the non-cleared destination IP address.

15. The method of claim 9, further comprising periodically performing a DNS lookup on exact hostname descriptors on the cleared sites list and adding one or more resulting DNS-resolved IP addresses to the cleared IP list; the exact hostname descriptors on the cleared sites list being hostname descriptors that do not include wildcards.

16. A walled garden system for providing access from user devices to one or more websites specified on a cleared sites list, the cleared sites list having one or more hostname descriptors, the walled garden system comprising:

a cleared internet protocol (IP) list including one or more cleared IP addresses corresponding to websites on the cleared sites list, wherein the cleared sites list contains a list of external websites accessible by a user and specified by either IP addresses or hostnames;

means for permitting direct transfer of only cleared hypertext transfer protocol (HTTP) requests from a user device, wherein each of the cleared HTTP requests is to a cleared destination IP address that matches one of the cleared IP addresses;

means for examining non-cleared HTTP requests from the user device, wherein each of the non-cleared HTTP requests is to a non-cleared destination IP address that does not match one of the cleared IP addresses;

means for transparent proxying between the user device and a non-cleared destination IP address of a non-cleared HTTP request when any of a destination host header and a referrer header of the non-cleared HTTP request matches a hostname descriptor of the cleared sites list;

means for blocking the non-cleared HTTP request when neither of the destination host header nor the referrer header of the non-cleared HTTP request matches a hostname descriptor of the cleared sites list;

means for adding, with a first expiry setting, the destination IP address of the non-cleared HTTP request to the cleared IP addresses when the destination host header of the non-cleared HTTP request matches a hostname descriptor of the cleared sites list; and means for adding, with a second expiry setting, the destination IP address of the non-cleared HTTP request to the cleared IP addresses when only the referrer header of the non-cleared HTTP request matches a hostname descriptor of the cleared sites list.

* * * * *